United States Patent Office 2,933,484
Patented Apr. 19, 1960

2,933,484
TREATMENT OF POLYOLEFINS

George A. Klumb, Jr., and Charles E. Speer, Lake Jackson, Tex., assignors to The Dow Chemical Company, Midland, Mich., a corporation of Delaware No Drawing. Application November 20, 1956
Serial No. 623,289

5 Claims. (Cl. 260—94.9)

This invention has reference to an improved treatment for polymerized olefinic and other ethylenically unsaturated materials of the type that have been prepared with certain catalytic metal compounds in order to actually improve and tend to whiten their color and other of their aesthetic characteristics.

Various olefins and other ethylenically unsaturated materials, particularly ethylene and propylene, may be polymerized (even as relatively impure materials) to considerably high molecular weight polymeric compounds by emulation of a procedure that is in general accordance with a process which was first proposed by Dr. Karl Ziegler and his associates in Germany. In this process, as has been described in Belgian Patent Number 533,362, mixtures of strong reducing agents, such as aluminum alkyls, with a compound selected from the group consisting of compounds of Group IV–B, V–B and VI–B metals of the Mendeléeff Periodic System, including thorium and uranium, are employed as catalysts in a peculiar catalyst system for the polymerization. Polyethylenes, for example, having apparent molecular weights (as my be determined by observation of such of their intrinsic properties as melt viscosity and the like) that are usually well in excess of 20,000 and generally greater than about 40,000 and which frequently may be in the range from 100,000 to 3,000,000 can be manufactured by polymerizing ethylene gas under the influence of such catalyst systems.

Pursuant to the preferred comprehension of the Ziegler process as disclosed in the referred-to Belgian patent, relatively low temperatures and pressures may advantageously be utilized for the preparation of such polymeric materials. Thus, ethylene gas may be efficiently polymerized under the influence of the indicated varieties of catalyst systems at temperatures beneath about 100° C., preferably in the neighborhood of 50° C., and under pressures of less than about 100 atmospheres, preferably in the neighborhood of 1 to 10 atmospheres. Other techniques, however, for performing the reaction have also been found eminently satisfactory. In many cases, such alternative procedures may be highly advantageous. Thus, lesser quantities of the catalyst admixture may be required and polymeric products desirable in many respects and having diminished catalyst residues may be obtained when the polymerization is conducted according to the method for Polymerization Of Ethylene and the like that has been disclosed by Earle B. Barnes, John E. Thomson and George A. Klumb, Jr., in the copending application having Serial Number 539,674 which was filed on October 10, 1955. According to such method, the polymerization in the presence of Ziegler-type catalyst systems may be accomplished advantageously at relatively high temperatures in excess of about 175° C., preferably from 200° C. to 300° C., and under relatively high pressures greater than about 500 atmospheres, preferably from 1,000 to 2,000 or more atmospheres. Any of a variety of inert liquid media may be employed as vehicles during the polymerization including low boiling hydrocarbon solvents and the like, as have been discussed in the referred to disclosures.

The polyethylenes and other polyolefins prepared under the influence of catalyst systems patterned after the varieties adapted for employment in the identified Ziegler process have superior and highly desirable properties. Characteristically, they are essentially linear polymeric structures that are usually found to be devoid of extensive side-chain networks. In the instances where the basic recurring olefinic unit is a monomer other than ethylene, the substituent groups that occur along the molecular chain of such essentially linear polymeric materials are found, almost without exception to be derived merely from the pendant portion contributed by the monomer itself. And polyethylene, for example, may itself be made under the influence of Ziegler catalyst systems so as to contain less than 3.0 and even less than 0.03 methyl groups per 100 methylene groups in the polymer molecule. The practically completely linear, macromolecular polymer molecules are generally found to be crystalline almost to their melting points, which usually fall at least within and frequently exceed the 125–135° C. temperature range. They are insoluble in most solvents at ordinary temperatures and have remarkable tendencies to be exceedingly strong and tenacious. Shaped articles formed with such varieties of polyethylene, for example, have tear strengths between about 1400 and 2800 pounds per square inch. Unstretched films prepared from such polyethylenes have tensile strengths in excess of about 2800 pounds per square inch and may be oriented by stretching to polyethylene film structures having tensile strengths as great as about 42,500 pounds per square inch.

The strong reducing agents which are employed with such salutary benefit in Ziegler-type catalyst systems include an assortment of aluminum trialkyls, such as aluminum trimethyl, aluminum tripropyl, aluminum triisobutyl and higher aluminum trialkyls as well as dialkyl aluminum halides and dialkyl aluminum hydrides. Salts of titanium, zirconium, vanadium, uranium, thorium and chromium are often preferable to employ as the Groups IV–B, V–B and VI–B metallic compounds in the catalyst system although salts of the remaining metals in these subgroups may also be employed. Compounds of these metals including their halogenides, oxyhalogenides, complex halogenides, freshly precipitated oxides and hydroxides and such organic compounds as alcoholates, acetates, benzoates, acetyl acetonates and the like may be used in such catalyst systems.

A particular active mixture for catalyst systems in accord with the Ziegler concept may be obtained by mixing a titanium or zirconium compound, such as a tetrachloride, oxychloride or acetyl acetonate with the reducing agent, such as an aluminum alkyl. The proportions of the catalyst admixture which may be employed suitably may vary with circumstances and may also depend upon the degree of purity of the materials being polymerized and the particular conditions involved in the reaction that is being performed.

After polymerization under the influence of a Ziegler catalyst system, however, polyethylene and similar polymerized olefin products seem unavoidable to contain catalytically active residues from the admixed catalyst system that has been employed. The residues are not completely removed by the conventionally utilized aftertreatments of polymeric materials prepared with Ziegler catalyst systems. Such aftertreatments, according to the comprehension of the Ziegler process, may involve lixiviation of the catalyst residue-containing polymeric product to at least partially dissolve out or otherwise extract the heavy metal-including residue without solubilizing the polymer. Liquid solvent substances that do not deleteriously affect or tend to dissolve the polymer product which have been proposed and utilized for such aftertreating purposes include such low molecular weight aliphatic alcohols as methanol, isopropanol and butanol, such hydrocarbon solvents as pentane and hexane and such other equivalent or relatively commensurate solvent substances as acetone.

It has been observed that such aftertreatments are not completely effective for color removal even though they may serve, to a greater or lesser extent, to bring about some lightening of the polymeric product. In addition, they invariably impart a readily-noticeable, usually disagreeable and sometimes actually offensive odor to the treated polymer. Other stabilizing treatments to accomplish the same purpose which have been proposed for aftertreating polymeric materials prepared under the influence of Ziegler catalyst systems have also been found to be not always completely efficacious. Thus, they may achieve no more than the mere arrest of the native, as-manufactured color in the polymer and not be capable of exerting an actual positive lightening or whitening effect thereupon. Likewise, they may also cause the treated polymer to assume undesired odors which quite often may be reminiscent of the treating reagents that have been employed. Or, they may not be completely or equally effective for the intended purpose upon all of the polymeric products that may be prepared under the influence of Ziegler catalyst systems. For example, while they may be effective to a substantially complete or at least to a decidely more pronounced degree upon polymers prepared with Ziegler catalyst systems at relatively low temperatures and under relatively low pressures beneath, say, about 100 atmospheres they may, surprising as it may seem, provide only minimum benefit for aftertreating polymers prepared with Ziegler catalyst systems at elevated temperatures and under relatively high pressures, as in accordance with the above-identified proces of Barnes, Thomson and Klumb, Jr.

This phenomenon, by way of illustration, seems to be associated with the treating procedure that has been proposed by Frank A. Bartolomeo, Harvey D. Ledbetter and James M. McDuff in their copending application for a Method For Stabilizing Polymerized Olefins Prepared With Catalytic Metal Compounds And Compositions Thereby Obtained having Serial Number 534,873 which was filed on September 16, 1955. In the referred-to procedure, the heavy metal constituents in catalyst residues of polymerized olefinic and other ethylenically unsaturated compounds, particularly polyethylene, prepared according to the Ziegler process may be inactivated so as to stabilize the resulting polymer product to discoloration by heat and light by a treatment which comprises contacting the catalyst residue-containing polymer product with a nitrogen-containing compound of the amine type, including ammonia. While the aftertreatment of Bartolomeo, Ledbetter and McDuff is of great benefit when it is practiced with polymeric products prepared under conditions of relatively low temperature and pressure, it is not completely effective and may not at times be satisfactory for aftertreatment of polymeric products manufactured at elevated temperatures and under high pressures with the assistance of Ziegler catalyst systems as by the referred to method of Barnes, Thomson and Klumb, Jr.

It would be a substantial advantage for an aftertreatment to be available that would not be hindered by the indicated shortcomings and deficiencies for purposes of ameliorating the characteristics of polymeric materials prepared under the influence of Ziegler catalyst systems. Such a treatment would thus not only be effective to produce a final product having a lessened or eliminated tendency to darken or degrade upon being shaped, molded or otherwise formed into structures, particularly when subjected to heat or upon exposure to light, but would also be capable of positively and significantly lightening the color of the polymer product. It would also not contribute to the assumption of an undesirable stench or odor in the treated product. And, of no minor consequence, it would be adapted to be employed satisfactorily to attain desirable results with any and all polymeric materials prepared under the influence or with the assistance of Ziegler catalyst systems, regardless of the temperature and pressure conditions that may have been utilized in the polymerization process. In this way, the treatment would provide equally advantageous benefit for polymeric materials of the indicated variety regardless of their having been prepared either with relatively low or relatively high combinations of temperature and pressure. The realization of these desiderations and the attainment of corollary advantages and benefits are among the principal objectives of the invention.

To these ends, the present invention comprehends treating polymerized olefinic and other ethylenically unsaturated materials, particularly polyethylene, prepared under the influence of Ziegler catalyst systems by a process which comprises subjecting the polymeric product after its polymerization and while it is in a molten condition to intimate contact with ammonium hydroxide. It is generally beneficial to accomplish the treatment before the polymerized product has been permitted to be exposed to oxygen, as from air in the atmosphere. Advantageously, the treatment may be accomplished with an aqueous ammonium hydroxide solution having a concentration between about 10 and 60 percent by weight. More advantageously, a 10 to 30 percent and, preferably a 20 percent, aqueous ammonium hydroxide solution may be employed.

The desired result can be achieved with the weight ratio of ammonium hydroxide reagent to treated polymer being varied over an extremely wide range. All that is required as a minimum is to employ a quantity of reagent, however small it may be, that is adequate and sufficient to facilitate intimate contact with the entire mass of polymer product being treated. The maximum quantity is actually unlimited but is governed, for practical purposes, by economical considerations, including reagent cost, thermal efficiencies and difficulties in separation that may be involved when greatly excessive proportions of the reagent are utilized. Ordinarily, an amount of the ammonium hydroxide reagent that is between about 1 and 10 percent by weight, based on the weight of the polymer product being treated, may be found suitable. Quite often, amounts in the neighborhood of 5 percent by weight of reagent, say from about 3 to 7 percent, may be preferable to employ.

The treatment may be conducted on a batch or continuous basis, as may be desired. Of course, when batch techniques are utilized, efficient agitation must be effected to achieve the desired intimate contact. Otherwise, only a portion of the polymer may be benefited. In this connection, it is essential to maintain the polymer in a molten condition during the treatment to avoid merely augmenting the surface characteristics of a solidified material. Thus, excessive quantities of reagent which may tend to overchill the molten polymer should not be employed if compensatory heating means are not available. Continuous treatment may readily and conveniently be effected by metering in and interdispersing the ammonium hydroxide reagent in a flowing stream of the molten polymer. Known techniques may be utilized to achieve such continuous contact, including passage of the flowing stream in a turbulent manner through conduits or chambers and even, if desired, utilization of physical blending or dispersing apparatus.

The temperatures and pressures involved in the treatment of the invention are relatively immaterial so long as the polymer product remains molten until the requisite intimate contact has been established and the apparatus utilized is adapted to withstand any autogenous pressure that may develop until consummation of the treatment. After or during the treatment, the bulk and generally substantially all of the reagent is vaporized from the treated polymer due to its hot, molten condition. However, if the conditions of treatment are such as to solidify all or part of the polymer so as to leave at least a portion of the reagent in liquefied association with the solid treated product, separation of the reagent from the treated polymer may be accomplished by conventional techniques including filtration, centrifugation, decantation, drying and the like.

Polymeric products prepared with Ziegler catalyst systems at relatively low temperatures and under relatively low pressures ordinarily require special melting after their preparation in order to accomplish the treatment of the invention. However, similar products that have been manufactured at sufficiently high temperatures (usually under correspondingly high pressures) may be conveniently treated while they remain in the molten condition (in which they are generally obtained by such processes) after being vented or removed from the polymerization reactor in which they were prepared. Under such circumstances, continuous treatments may be effected with especial benefit since the ammonium hydroxide reagent can be readily brought into contact with the polymer product, for example, as it is being passed in molten condition from the post-polymerization separator to an extrusion point or other storage facility prior to solidification.

Not only are the heavy metal constituents of the polymeric products that remain after the polymerization in the presence of the Ziegler catalyst system substantially catalytically inactivated by the treatment of the invention, but the product itself is actually positively whitened to an appreciable and significant extent. Thus, a more attractive product having little or no tendency to degrade, deteriorate or discolor upon exposure to heat or light may advantageously be obtained. In addition, very little, if any, odor can be detected in the treated polymer product, especially when reagents of less than 30 percent by weight strength are utilized in the practice of the invention. The odor level of polymers treated in accordance with the invention is far less than in like polymers that have been aftertreated for their stabilization against discoloration by any of the heretofore known techniques. And they may almost always be obtained with a color that is so near to a true chalk white that visual distinguishment is only apparent when a contrast is made against an absolutely pure white background. The whitening effect that may be achieved by practice of the invention is extremely unusual since, invariably, polymers prepared with Ziegler catalyst systems are off-white in color even when they have been aftertreated for stabilization. This is particularly the case for polymeric products, especially polyethylene, prepared at relatively high temperatures and under relatively high pressures with the assistance of Ziegler-type catalysts. Polymers produced by such species of process are generally obtained with a dissatisfactory natural yellow to tan shade of coloration. In addition, the polymers prepared at elevated temperatures and under high pressures with Ziegler-type catalysts seem especially prone to become dark if they are not aftertreated before being permitted to be exposed to air.

By way of further illustration, polyethylene was prepared by polymerizing ethylene gas in the presence of an admixed titanium tetrachloride and aluminum triethyl catalyst under a pressure of about 18,000 pounds per square inch (gauge) and at a temperature of about 250° C. in accordance with the procedure set forth in the referred-to copending application Serial Number 539,674.

The polymer, after being so prepared, was transferred from the reactor to a separating apparatus for isolating it from the unreacted ethylene and depressurizing it while it was in a molten condition. From the separator, it was passed in a molten condition at a rate of about 40 pounds per hour to a feed hopper for an extrusion device. Prior to and throughout this transfer, the molten polymer was not permitted to be exposed to air. About 0.064 pound per hour of a 20 percent by weight aqueous solution of ammonium hydroxide was continuously metered into the molten polymer at a proportionate rate as the polymer was flowing from the separating apparatus to the extruder hopper. An intimate contact between the reagent and molten polymer was obtained during this passage through about a twenty foot length of standard weight, one and one-half inch outer diameter pipe. The extruded polymer product had an extremely white color and little, if any, odor. In comparison, polymer extruded directly without the ammonium hydroxide treatment had a strong and offensive odor and an objectional yellow-tan shade of color. Similar excellent results were obtained with ammonium hydroxide reagents having concentrations from 10 to 30 percent by weight.

When the foregoing procedure was twice repeated identically excepting to separately employ ammonia and water as treating reagents; the product polymer had a strong odor and a decidedly yellow-tan color. Attempts to treat the polymer in the same manner with a polyglycol compound having the formula:

$$H-[O-CH_2-CH(CH_3)-]_{34}-OH$$

with ethanol; with capryl alcohol; with an equal mixture by weight of the above-identified polyglycol and ethanol and with "Ionol" (a product that is available from the Shell Chemical Company which is widely employed as an antioxidant material and is believed to be 2,6-ditertiary butyl-4-methyl phenol) were likewise ineffective to produce a substantially odor-free and white product. All of the polymeric products that were so-treated without the scope of the invention had strong odors and objectionable yellow to tan colorations.

Analogous good results are obtainable when polyethylene prepared directly as a solid at low temperature and pressure in the presence of Ziegler catalyst systems is treated in the foregoing manner with ammonium hydroxide after being polymerized and subsequently especially molten for the treatment. Likewise, equivalent benefit may be realized when other polyolefins and the like which may be prepared under the influence or with the assistance of Ziegler catalyst systems are treated while in a molten condition with ammonium hydroxide reagents in accordance with the invention.

What is claimed is:

1. Treatment for polymerized, ethylenically unsaturated materials prepared with a catalyst system of the variety adapted to polymerize ethylene and propylene in inert non-aqueous liquid media at temperatures between about 50° C. and 300° C. under pressures between about 1 and about 2,000 atmospheres to normally solid polyolefin polymer products, which system consists essentially of a mixture of (1) a strong reducing agent selected from the group consisting of aluminum trialkyls, dialkyl aluminum halides and dialkyl aluminum hydrides with (2) a metal compound selected from the group consisting of halogenides, oxyhalogenides, complex halogenides, freshly precipitated oxides, freshly precipitated hydroxides, alcoholates, acetates, benzoates, and acetyl acetonates of the Groups IV–B, V–B and VI–B metals of the Mendeléeff Periodic System which treatment, as a process, comprises subjecting the polymeric product while it is in a molten condition at a temperature between about 125° C. and 300° C. to intimate contact with an amount between about 1 and 10 percent by weight, based on polymer weight, of an aqueous ammonium hydroxide reagent having a concentration of ammonium hydroxide between about 10 and 60 percent by weight.

2. The treatment of claim 1, wherein the concentration of ammonium hydroxide in the reagent is between about 10 and 30 percent by weight.

3. The treatment of claim 1, wherein the molten polymer is contacted with a quantity of the reagent that is in an amount between about 3 to 7 percent by weight of the polymer.

4. The treatment of claim 1, performed before the polymeric product has been permitted to be exposed to air.

5. The treatment of claim 1, performed on polyethylene.

References Cited in the file of this patent

UNITED STATES PATENTS

| | | |
|---|---|---|
| 2,827,445 | Bartolomeo | Mar. 18, 1958 |
| 2,838,477 | Roelen et al. | June 10, 1958 |
| 2,886,561 | Reynolds et al. | May 12, 1959 |

FOREIGN PATENTS

| | | |
|---|---|---|
| 533,362 | Belgium | May 16, 1955 |
| 115,214 | Australia | Feb. 21, 1946 |